United States Patent [19]
Kuriacose

[11] Patent Number: 5,231,384
[45] Date of Patent: Jul. 27, 1993

[54] APPARATUS FOR SPLITTING VIDEO SIGNAL BETWEEN TWO CHANNELS

[75] Inventor: Joseph Kuriacose, Plainsboro, N.J.

[73] Assignee: General Electric Company, Princeton, N.J.

[21] Appl. No.: 750,164

[22] Filed: Aug. 26, 1991

[51] Int. Cl.⁵ .................. H04N 7/04; H04N 7/12; H04N 7/00

[52] U.S. Cl. ..................... 358/141; 358/133; 358/135

[58] Field of Search .............. 358/141, 142, 133, 135, 358/136, 12

[56] References Cited

U.S. PATENT DOCUMENTS

| | | | |
|---|---|---|---|
| 4,873,577 | 10/1989 | Chamzas | 358/133 X |
| 4,903,125 | 2/1990 | Parker | 358/141 |
| 4,933,762 | 6/1990 | Guichard et al. | 358/133 |
| 5,055,927 | 10/1991 | Keesen et al. | 358/133 |
| 5,063,444 | 11/1991 | Knauer et al. | 358/133 |
| 5,111,292 | 5/1992 | Kuriacose et al. | 358/133 |
| 5,122,875 | 6/1992 | Raychaudhuri et al. | 358/133 |
| 5,144,425 | 9/1992 | Joseph | 358/133 |

OTHER PUBLICATIONS

J. Zedepski et al., "Prioritized Packet Transport of VBR CCITT H.261 Format Compressed Video on a CSMA/CD LAN." presented at the Third International Workshop on Packet Video, Morristown, N.J. Mar. 22-23, 1990.

Primary Examiner—John K. Peng
Assistant Examiner—Safet Metjahic
Attorney, Agent, or Firm—Joseph S. Tripoli; Eric P. Herrmann; Ronald H. Kurdyla

[57] ABSTRACT

A video signal compression system provides compressed video data in groups of frames and divides the compressed video data between high and low priority channels according to a predetermined hierarchy of compressed video codeword types. The fraction of data to be applied to the respective channels is not determined by the ratio of the data handling capacity of the two channels, but rather on a frame by frame basis in accordance with the actual channel capacity remaining for the respective group of frames.

5 Claims, 5 Drawing Sheets

APPARATUS FOR SPLITTING VIDEO SIGNAL BETWEEN TWO CHANNELS

This invention relates to a system for dividing compressed video data between two data streams.

BACKGROUND OF THE INVENTION

Digital high definition video data may be successfully transmitted over terrestrial television channels by generating compressed video data, partitioning the video data between high and low priority information, and quadrature amplitude modulating the high and low priority data on separate carriers respectively. The modulated carriers are included in a 6 MHZ frequency spectrum and then the combined signal is translated to occupy a standard broadcast channel spectrum. The high priority data is transmitted with relatively high power and the low priority data with relatively low power. High priority data is that video data which is sufficient to reproduce an image, albeit of lesser quality than a high definition image.

The present invention is directed to circuitry for separating compressed video data between relatively high and low priority video data. For purposes of this disclosure the video data will be presumed to be compressed in MPEG like format (through any data format which may be hierarchically layered is susceptible of use). What is meant by "MPEG like" is a coding format similar to the standardized coding format being established by the International Organization for Standardization. The standard is described in the document "International Organization for Standardization", ISO-IEC JT(1/SC2/WG1), Coding of Moving Pictures and Associated Audio, MPEG 90/176 Rev. 2, Dec. 18, 1990, which document is incorporated herein by reference for description of the general code format.

The MPEG standard transmits 240 lines (NTSC) per frame non-interlaced, which is typically accomplished by encoding only the odd or even fields of an interlaced source video signal. For transmitting HDTV signals the standard is modified to provide, for example 480 lines per field, and both the odd and even fields are transmitted. In addition the number of pixels per line is increased to for example 1440. Conceptually these changes only affect the data rate and do not affect the compression philosophy. Of particular interest regarding this coding format is that successive frames are encoded according to a cyclical sequence wherein particular frames of the sequence are intraframe encoded (I frames), other frames (P frames) are forward interframe encoded, and still other frames (B frames) are both forward and backward interframe encoded. The encoded signal format for frames of each of the encoding types is similar but the relative importance of the types of encoded frames for image reproduction is I, P, B. Images may be reproduced from single I frames, however image reproduction for P or B frames requires information derived from prior decoded I or P frames The amount of data bits for respective encoded frames varies widely. In addition the percentage of information nominally considered to be low priority data in respective frames may vary widely. As such allocating data between high and low priority channels is not a simple matter of simply parsing a particular K percent of the data for each frame to the high priority channel and the remaining (100-K) percent to the low priority channel. The parsing becomes further complicated if the relative importance of the encoded frame types is included in the prioritizing process.

SUMMARY OF THE INVENTION

The present invention is directed toward apparatus for determining the percentage or fraction of data from respective encoded frames of video information that will be allocated between high and low priority channels. The fraction is determined independently for each frame. For each sequence of frames, the difference between the total channel capacity and the capacity utilized is monitored on a frame by frame basis, and based on the remaining capacity, the fraction of data to be allocated to the high priority channel is determined. In a first embodiment, the I, P, and B frames are treated equally and the fractions are determined according to the ratio of the remaining capacity of the high priority channel to the sum of the remaining capacities of the high and low priority channels, where the remaining capacities are determined after each frame is processed. In further embodiments the I, P and B frames are treated differently, with the fractions determined such that the I frame data occupies the majority of the high priority channel capacity. In this embodiment the I channel fraction is in general proportional to the remaining channel capacity.

DETAILED DESCRIPTION

Figure 1:
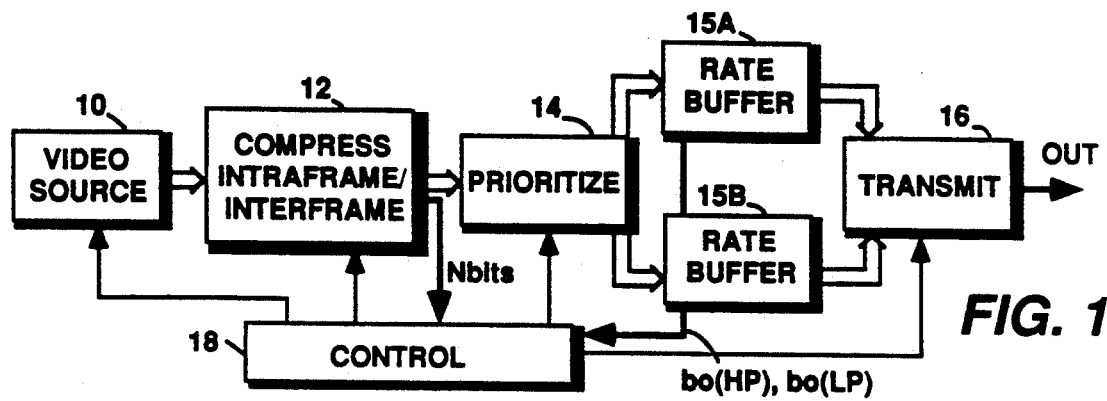
FIG. 1 is a block diagram of a video signal compression system embodying the invention.

FIG. 1 illustrates in block form a video signal compression system which may be utilized for transmitting high definition television (HDTV) signals. In this system the video signal is initially compressed in conformance with an MPEG-like format. Thereafter the MPEG-like signal codewords are parsed into two bit streams in accordance with the relative importance of the respective codeword types. The two bit streams are independently processed to apply error correction overhead bits, and then caused to QAM respective carriers. The modulated carriers are combined for transmission. The bit streams of relatively greater and lesser importance are designated high priority (HP) and low priority (LP) channels respectively. The high priority channel is transmitted with approximately twice the power of the lower priority channel. The high priority/low priority information ratio is approximately one-to-four. The approximate net data rates after forward error correction are 4.5 Mbps HP and 18 Mbps LP.

Figure 2:
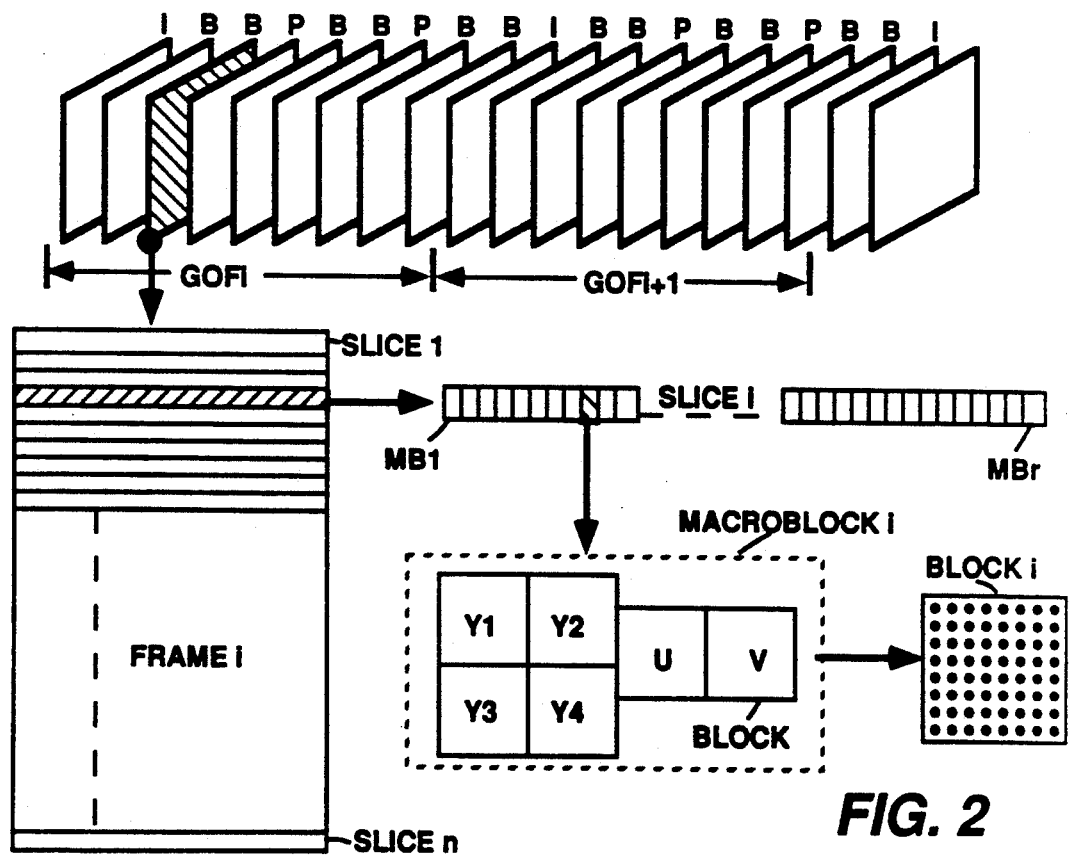
FIG. 2 is a pictorial representation of the layers of data provided by the compression circuit of FIG. 1.

In FIG. 1, video signals from a source 10, which may be a HDTV camera are applied to compression circuitry 12. The compression circuitry 12 compresses the video signal according to cyclical coding sequences identified as groups of frames, GOF, see FIG. 2. The coding sequence of a GOF includes a first frame (I) which is intraframe coded, followed by a plurality of B frames (bidirectional interframe coded) which are regularly interspersed with P frames (forward interframe coded). The coded data for P coded frames comprises compressed differences between the actual video frame and a frame predicted from the lastmost occurring I or P frame. The coded data for the B frames comprises compressed differences between the actual frame and the better of two predicted frames which are predicted from the I and P frames between which the particular B frame is disposed. The coded data for all frames is segmented into slices, which include, for example, the coded data for horizontal sections of respective images, with each section being a multiple of 16 pixels high. The slices are segmented into macroblocks. Each macroblock is comprised of 6 blocks, including four luminance blocks, one U chrominance block and one V chrominance block. A block represents a matrix of pixels, e.g., 8×8 over which, for example, a discrete cosine transform (DCT) is performed. The four luminance blocks are a 2×2 matrix of contiguous luminance blocks representing, e.g., a 16×16 pixel matrix. The chrominance (U and V) blocks represent the same total area as the four luminance blocks. That is the chrominance signal is subsampled by a factor of two horizontally and vertically relative to luminance, before compression.

Figure 3:
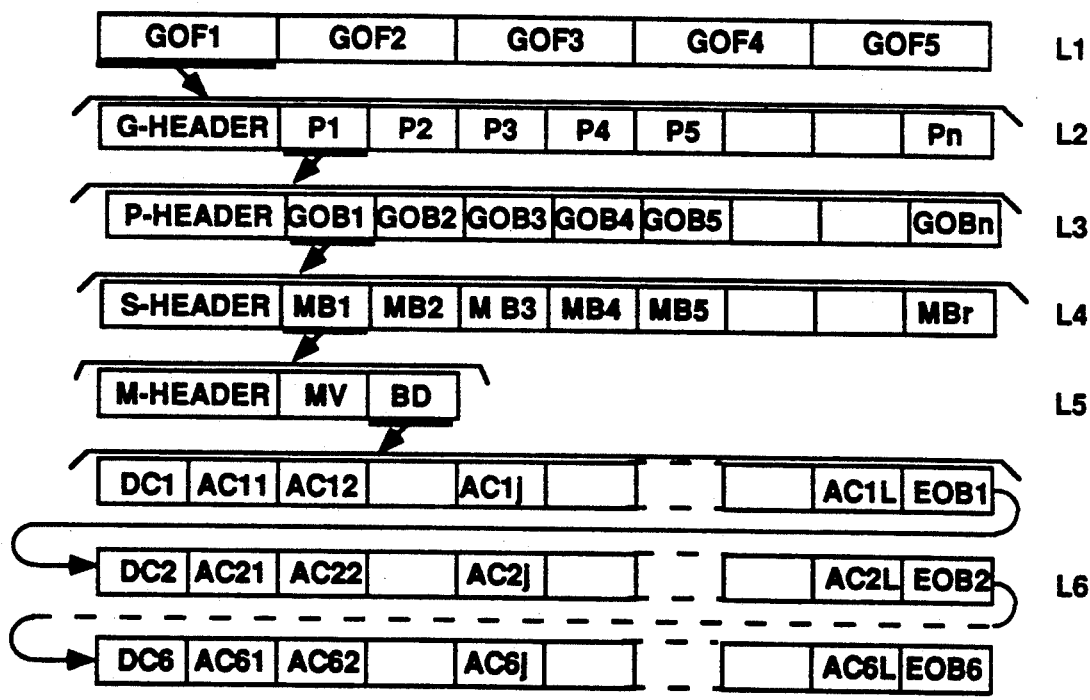
FIG. 3 is a generalized pictorial representation of the data format provided by the compression circuit of FIG. 1.

The coded output signal provided by the compressor 12 is generally in the layered format illustrated in FIG. 3. The top layer consists of groups of frames (GOF) illustrated by the row of boxes L1. Each GOF (L2) includes a header followed by segments of picture data. The GOF header may include data related to the horizontal and vertical picture size, the aspect ratio, the field/frame rate, the bit rate, etc.

The picture data (L3) corresponding to respective frames includes a header followed by slice data (L4). The picture header may include a frame number and a picture code type. Each slide (L4) includes a header followed by a plurality of blocks of data MBi. The slice header may include a group number and a quantization parameter.

Each block MBi (L5) represents a macroblock and includes a header followed by motion vectors and transform coefficients (e.g., Discrete Cosine Transform coefficients). The MBi headers may include a macroblock address, a macroblock type and a quantization parameter. The transform coefficients are illustrated in layer L6. The block coefficients are provided one block at a time with the DCT, DC coefficient occurring first followed by respective DCT AC coefficients in the order of their relative importance. An end of block code EOB is appended at the end of each successively occurring block of data.

Data from the compressor 12 is applied to a priority processor which parses the data between the HP and LP channels. The prioritized data is coupled to respective HP and LP rate buffers 15A and 15B.

As is well known compressed video data occurs at variable rates, and desirably, data is transmitted at a constant rate equivalent to the channel capacity, to realize efficient use of the channel. Rate buffers 15A and 15B perform the variable to constant data rate translation. It is also known to adjust the amount of data provided by the compressor 12 in accordance with the level of occupancy of the buffers. Thus the buffers 15A and 15B include circuitry to indicate their respective level of occupancy. These indications are applied to the controller 18 to adjust the average data rate provided by the compressor 12.

Compressed video data hierarchically formatted as indicated in FIG. 3 is coupled to a priority select element 14, which parses the coded data between a high priority channel HP and a low priority channel LP. Generally speaking, high priority information is that information, the loss or corruption of which, would create the greatest degradation in reproduced images. Stated conversely, it is the least data needed to create an image, albeit less than a perfect image. Low priority information is the remaining information. The high priority information includes substantially all of the header information included in the different hierarchical levels plus the DC coefficients of the respective blocks and a portion of the AC coefficients of the respective blocks (level 6, FIG. 3).

In the circuitry 16 the signals may be coupled to a transmission modem wherein the HP channel data quadrature amplitude modulates a first carrier and the LP channel data quadrature amplitude modulates a second carrier displaced from the first carrier by approximately 2.88 MHz. The 6 dB bandwidth of the modulated first and second carriers are respectively about 0.96 MHz and 3.84 MHz. The modulated first carrier is transmitted with approximately 9 dB greater power than the modulated second carrier. Since the HP information is transmitted with greater power it is much less prone to corruption by the transmission channel. The HP carrier is located in the portion of the frequency spectrum of an, e.g., NTSC TV, transmission channel normally occupied by the vestigial sideband of a standard NTSC TV signal. The LP carrier is located such that the LP data spectrum occupies the portion of an NTSC channel normally occupied by the upper sideband of the luminance information of a standard NTSC TV signal.

The compressed data that is transmitted may be statistically encoded. Statistical encoding may be performed in the compressor 12, or in or after prioritization of the data. Regardless of where statistical encoding is performed, for purposes of this description, it is presumed that the compressor 12 provides not only the compressed codewords, but also data regarding the type of each codeword and the length of each codeword. In the case that the codewords will be statistically encoded after prioritization, the length will correspond to the statistically encoded codeword length. It is also presumed that the compressor 12 includes an output memory for storing each frame of compressed data, and associated codeword lengths and types, such that for each new frame provided to the priority selection circuit 14, the total number of bits, Nbits, of the codewords included in such frame is available. This number may be provided by simply accumulating the data corresponding to the codeword lengths as the respective codewords are generated.

The compressed data occurs as a plurality of codeword types including for example Header Data, Motion Vectors, DC coefficients and AC coefficients. The relative importance of each codeword type to image reproduction is subjective and thus is a design choice. However it is generally conceded that the AC coefficients representing higher frequency information are of least importance. An exemplary codeword type hierarchy may classify GOF header codewords (−4), picture header and slice header codewords (−3), macroblock header codewords (−2), motion vectors (−1), DC coefficients (0) AC coefficients (1) to (64) etc. During prioritizing, the lower numbered classes will be sent to the HP channel, and the higher numbered classes directed to the LP channel according to a dynamic data split parameter designated Hfrac.

Figure 4:
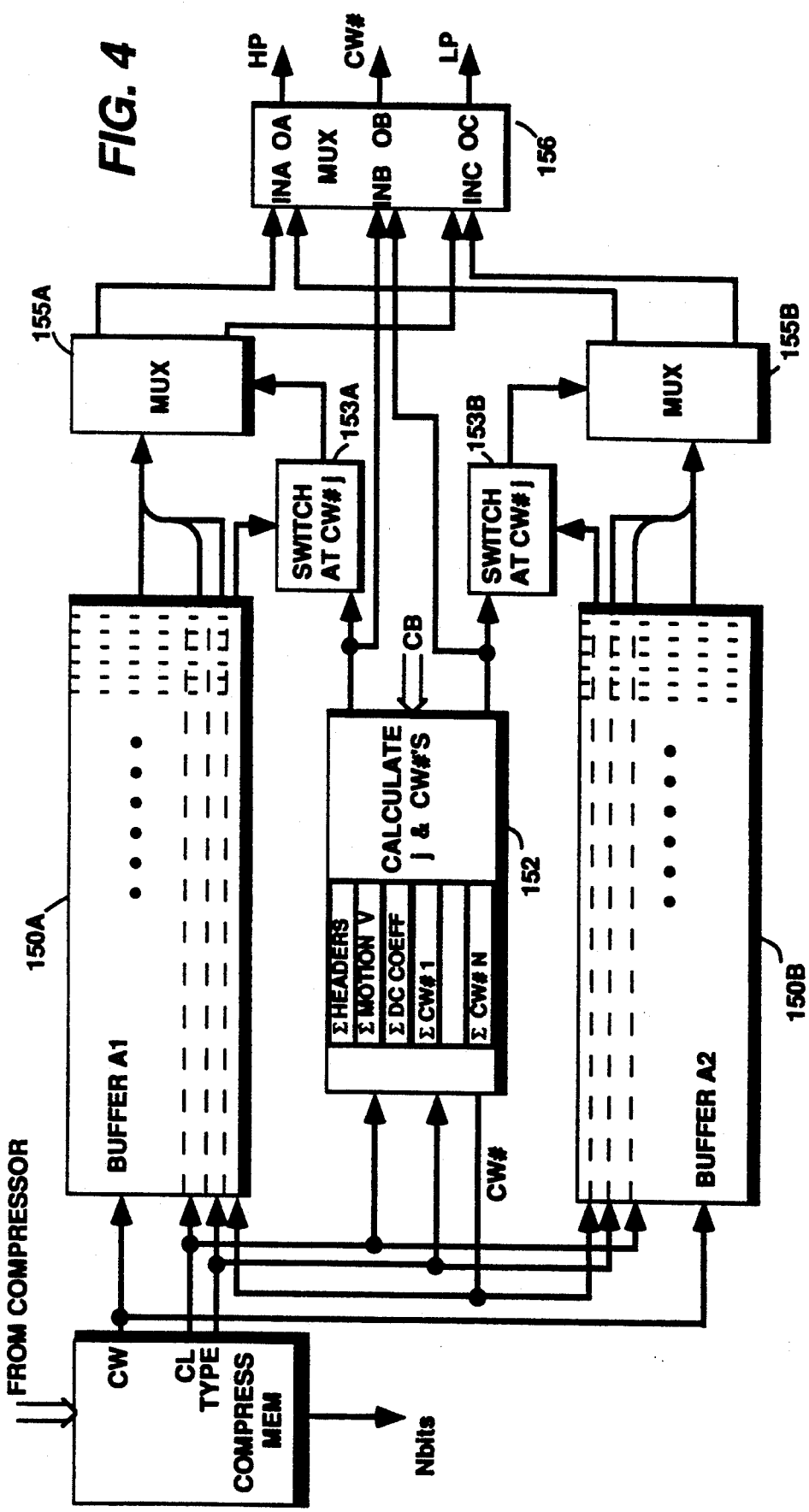
FIG. 4 is a block diagram of exemplary circuitry which may be implemented for the Priority Select circuitry of FIG. 1.

FIG. 4 illustrates exemplary apparatus for performing that portion of the priority selection process which parses the data into two channels. In FIG. 4, compressed data from 12 (i.e., the compressor output memory) is coupled to respective input ports of two buffer memories 150A and 150B and to a data analyzer 152. The respective buffers include enough memory to store for example a slice of data. The buffers 150A and 150B are operated in "ping-pong" fashion to alternately write slices of data and read slices of data. Thus while buffer 150A writes data from, e.g., slice n, buffer 150B reads data from slice n−1.

As data is written to a particular buffer, the analyzer 152, responsive to codeword type data, generates codeword classification numbers CW#i for respective codewords and stores the CW#i in association with the corresponding codeword. The analyzer also calculates the point, or codeword, at which the data should be split between HP and LP channels. The calculation is determined for the amount of data stored in the buffer 150A (150B). The total number of bits are counted for all the codewords in the buffer 150A (150B). Then the codeword class for which the sum of bits is equal to the HP percentage is identified by a codeword number, CW#j. This number is applied to a switching element 153A (153B), and used to control the multiplexer 155A (155B). After the codeword number CW#j is identified, the codewords, codelength data, codeword type data and codeword numbers CW#i are read in parallel from the buffer 150A (150B). The codewords, codelengths and codetypes are applied to the input of a multiplexer 155A (155B), and the codeword numbers are applied to an input of the switching element 153A (153B). As the data is read from the buffer, the switching element 153A (153B) compares the codeword classification numbers CW#i to the calculated number CW#j. For all codeword classification numbers less than or equal to CW#j, the switching element provides a control signal which conditions the multiplexer 155A (155B) to pass the corresponding data to the HP channel via a further multiplexer 156. For codeword classification numbers greater than CW#j, the multiplexer 155A (155B) is conditioned to pass the corresponding data to the LP channel via multiplexer 156. The multiplexer 156 is conditioned to pass HP and LP data provided by the buffer 150A, (150B) which is currently being read.

The analyzer 152 includes an accumulator which, responsive to the codelength and type signals, independently sums the number of bits of the codewords of each code type entered in the buffer 150A (150B). These sums are added to provide the total number of codeword bits contained in the buffer, (or statistically encoded codeword bits corresponding to the codewords contained in the buffer). The total sum is multiplied by Hfrac to produce a check sum. Thereafter the respective code type sums are sequentially added in ascending order of codeword classification number CW#i to produce partial sums. Each partial sum is compared with the check sum until the partial sum exceeds the check sum. The codeword classification number CW#j associated with the immediately previous partial sum is the last class of codewords within a block to be assigned to the HP channel. All succeeding classes of codewords, i.e., CW#j+1 to CW#n, for respective blocks are assigned to the LP channel. Thus it may be seen that what is considered to be high priority information, in fact varies between analysis periods, if high priority data is defined by the data applied to the HP channel.

Figure 5:
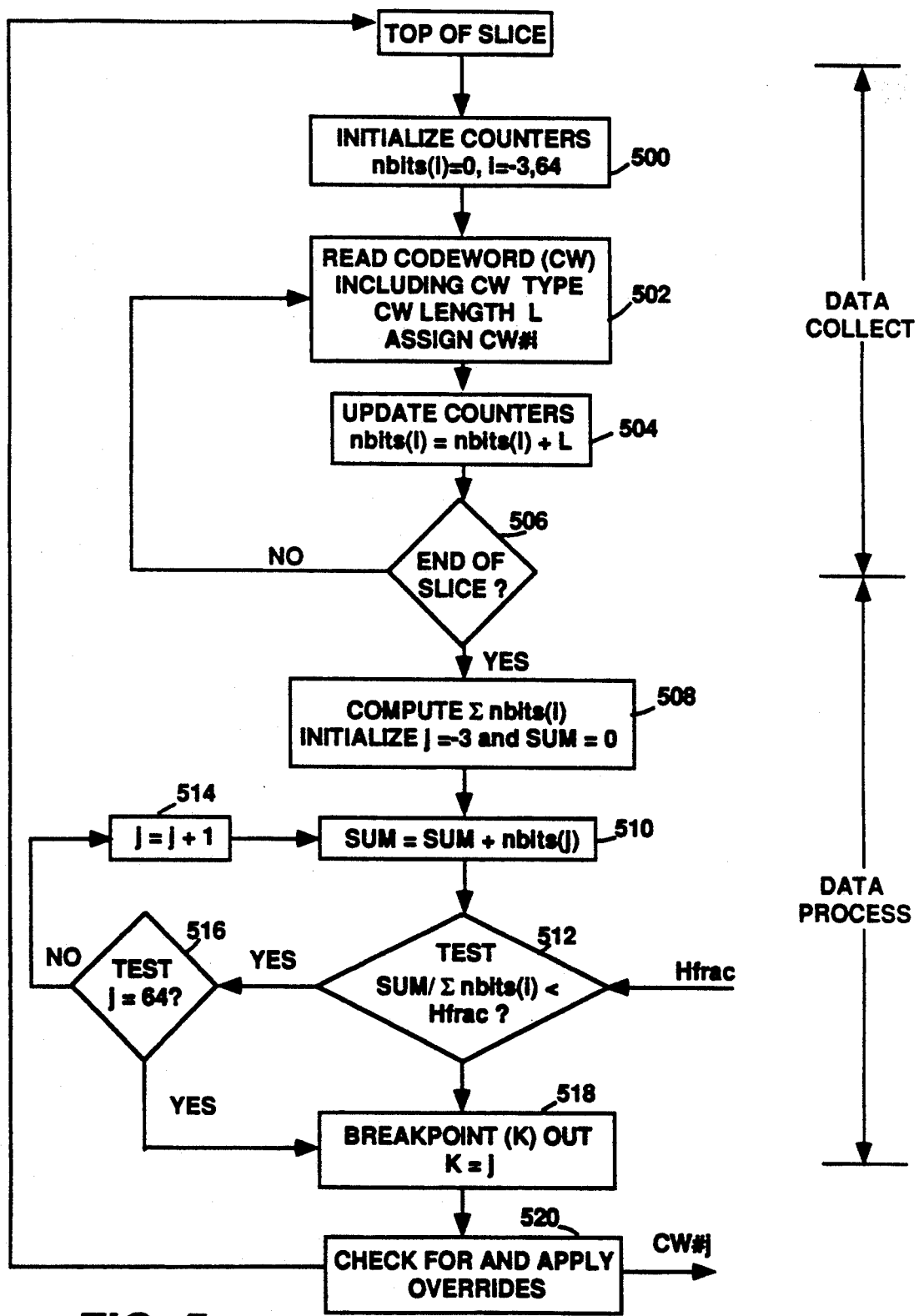
FIG. 5 is a flow chart indicating the process of generating the data division points.

FIG. 5 is a flow chart of the operation of the analyzer 152. At the beginning of each slice of data the analyzer resets [500] the count values of the respective types of codewords. Then as data is written into the respective buffer, the analyzer reads [502] the codeword type, the corresponding codeword length L, and assigns a codeword classification number CW#i depending upon the codeword type. The analyzer adds [504] the codeword length L to the sum of all previous codewords that have been assigned the same codeword classification number CW#i. It then checks [506] to determine if all data for a slice has been evaluated. This may be accomplished by examining the codeword types for the next occurring slice header. If the end of the slice has not occurred it continues [502]. If it has occurred the analyzer proceeds [508] to determine the HP/LP data breakpoint. This process is initiated by setting a partial sum value to zero, and then to begin accumulating [510] the sums of bits of the respective classes of codewords corresponding to the assigned CW#i's. That is the sum of bits of CW# −4 is added to the sum of bits of CW# −3 to produce a first partial sum. Then the sum of bits of CW# −2 is added to the first partial sum to produce a further partial sum and so on. Each time a partial sum is produced a comparison [512] is made between the ratio of the current partial sum to the total number of bits in the slice against Hfrac. If the ratio is less, the sum of bits of the codewords corresponding to the next higher classification CW#i is added [514, 510] to the previous partial sum. If the ratio is greater the index i=j of the last classification number CW#i, is output [518], i.e., the CW#j is output.

The system then applies any requisite overrides. For example the analysis period may include only GOF, picture and slice header data, all of which should be allocated to the HP channel. In this instance the calculated CW#j must be overridden since it will inherently direct some codewords to the LP channel. Overrides are effected by examining the frame types and checking the calculated CW#j against a table of override values [520]. The test [516] for j equal to 64 is included to preclude the system from entering an endless loop, since in this example CW#i cannot exceed 64.

The override commands and the value of Hfrac may be applied to the analyzer 152 from the system controller 18 via the control bus, CB. All necessary timing signals and control commands for the analyzer may also be provided via the control bus.

Because the proportion of what may nominally be considered high priority data varies from frame to frame, assigning a constant value to the percentage of data to be allocated to the HP channel becomes problematic, as the respective HP and LP channels may be caused to under and/or overflow. Therefore it is necessary to determine the proportions dynamically according to the data processed. The determination is performed frame by frame and the proportion of data from each frame to be allocated HP is hereinafter designated Hfrac.

Determination of Hfrac is done with data corresponding to respective groups of frames. The values for Hfrac, will in general, be proportional to the channel capacity remaining after data for prior frames in a group of frames has been allocated. In what follows, values for Hfrac will be determined for I, P, B frames treated equally, and for the I and P frames given precedence over B frames.

Define:

Bgof(T) = total bit capacity for a group of frames;
Bgof(HP) = total bit capacity for HP channel for a group of frames;
Blgof(T) = total bit capacity left to transmit remainder of GOF;
Blgof(HP) = bit capacity left on HP channel for remainder of GOF;
Bf(T) = total bits transmitted for current frame;
Bf(HP) = bits transmitted on HP channel for current frame.

First consider the situation where I, P, B frames are treated equally. Nominally the amount of data for each frame to be allocated to the HP channel should correspond to the ratio of the HP channel capacity to the total channel capacity, i.e., the fraction Bgof(HP)/Bgof(T). However, due to constraints mentioned above (e.g., overrides) the actual amount of data directed to the HP channel, for particular frames may differ from this fraction. Assume that for a number of first frames in a GOF there is data allocated to the HP channel in significant excess of the fraction Bgof(HP)/Bgof(T). If the system continues to attempt to allocate data for the remaining frames to the HP channel according to the fraction Bgof(HP)/Bgof(T) the HP channel will tend to overflow and the LP channel to underflow. Alternatively, if data is allocated to the HP channel based on the remaining capacity of the HP channel such over/underflow situations may be avoided. As such, the fraction of data for respective frames of a group of frames, to be allocated to the HP channel is determined from the relation Blgof(HP)/Blgof(T). This calculation is made following the allocation of HP data for each frame.

In order to make this calculation the following process is pursued. Upon initialization of the system, the values Bf(T) and Bf(HP) are set to zero and the values Blgof(T) and Blgof(HP) are set to zero. At the beginning of each GOF, the values Blgof(T) and Blgof(HP) are updated with the values Bgof(T) and Bgof(HP) respectively, that is $$Blgof(T)_{new\ GOF} = Blgof(T)_{last} + Bgof(T)$$

$$Blgof(HP)_{new\ GOF} = Blgof(HP)_{last} + Bgof(HP),$$

and Hfrac is calculated as Hfrac = Blgof(HP)/Blgof(T).

The value for Hfrac is communicated to the priority select circuitry 14 and based upon the value Hfrac the codeword number CW#j is determined. A check is made to determine whether excess data has been allocated to the HP channel in prior CW#j analysis periods. This check may consist of generating the ratio Bf(HP)/Bf(T), and comparing it with Hfrac. If the ratio exceeds Hfrac too much data has been allocated to the HP channel. To counteract this situation CW#j is reduced to (CW#j−1). The codewords are then parsed between the HP and LP channels. The accumulated values for the amount of HP data and total data for the current CW#j analysis period are respectively added to the values Bf(HP) and Bf(T). The updated values Bf(HP) and Bf(T) are utilized in the subsequent CW#j analysis period to check for excess data being allocated to the HP channel. At the end of each frame the values Bf(HP) and Bf(T) are subtracted from the values Blgof(HP) and Blgof(T) respectively and then the values Bf(HP) and Bf(T) are reset to zero.

Next consider an alternative system in which it is desired that I frames be given precedence such that the majority of I frame data is transmitted on the HP channel. This may be accomplished by conditioning the system to substantially fill the HP rate buffer with I frame data and thereafter allowing the HP rate buffer to empty during the remainder of the GOF. The I frame data is not permitted to completely fill the HP rate buffer as some space is required for some information from the P and B frames in each GOF. The percent PHP of the HP rate buffer capacity that the I frame data is permitted to occupy is a design choice. The larger PHP is made the larger the precedence given to the I frames.

In addition to the previous variables, define;

bo(HP) = occupancy of the HP channel rate buffer (15A);
bo(LP) = occupancy of the LP channel rate buffer (15B);
bsize(LP) = the size of the LP rate buffer (15B);
bsize(HP) = the size of the HP rate buffer (15A),
Ns = the number of source frames per second,
N = the number of frames in a GOF,
M = the number of B frames between successive P frames plus 1,
R(LP) = the LP channel bit rate,
R(HP) = the HP channel bit rate,
R(T) = the total channel bit rate.

Figure 6:
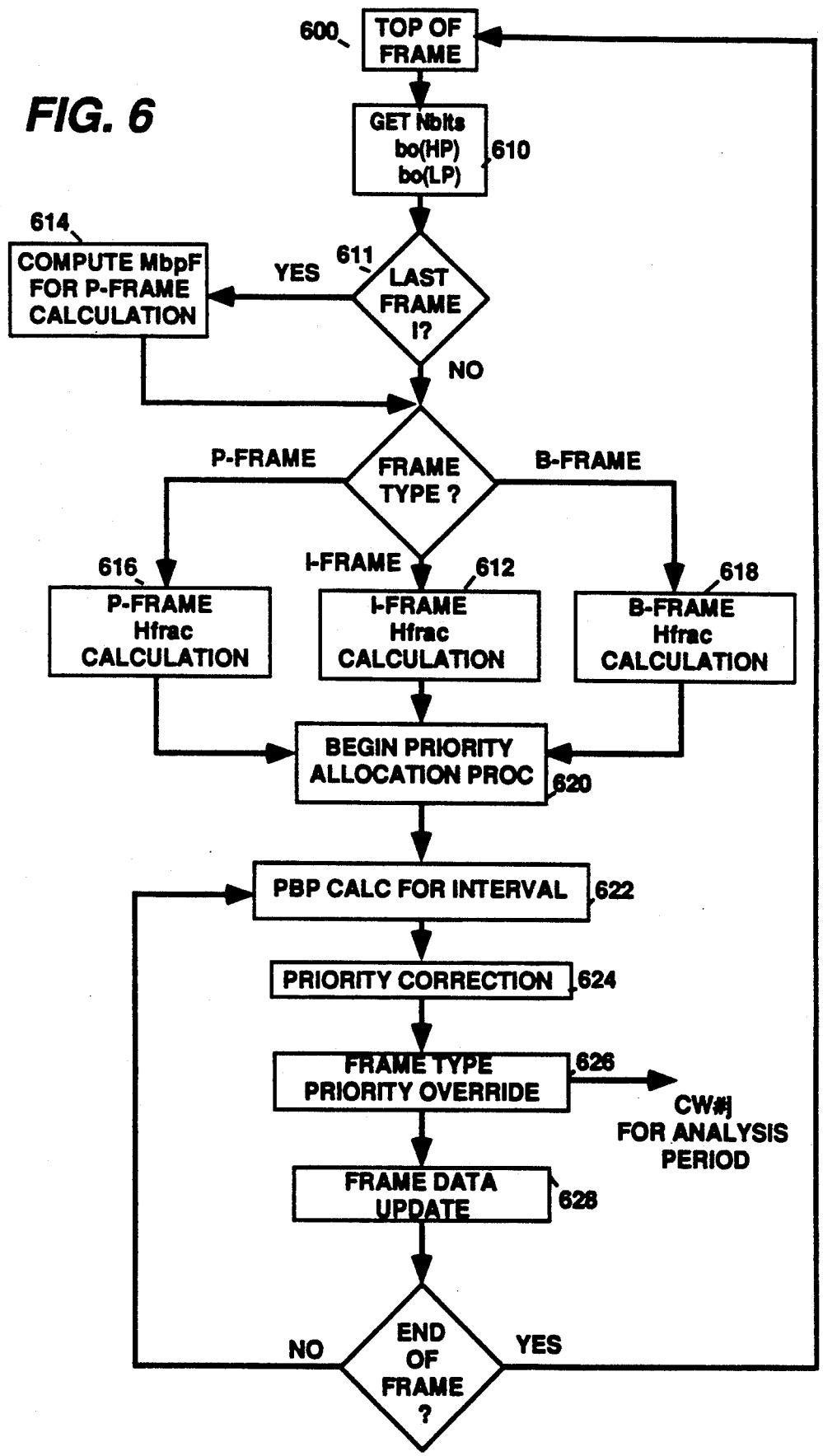
FIG. 6 is a flow chart of the process for determining the fraction of data for respective frames to be allocated to the respective high and low priority channels.

Discussion of this method of calculating Hfrac will be with reference to the flow diagram of FIG. 6. When the system is initialized Blgof(HP) and Blgof(T), are initialized to zero. Note the system processes I, P and B frames in a known sequence starting with an I frame. At the beginning of a frame [600], the value Nbits is accessed and Bf(T) and Bf(HP) are set to zero. The values bo(HP) and bo(LP) are accessed [610] from the rate buffers. A check [611] is made to determine if the last frame was an I frame. If so a variable MbpF is calculated [614] for use in generating Hfrac for subsequent P frames. This variable is calculated according to the relation, $$MbpF = \{bo(HP) - R(HP)*(N-1)/Ns\}/(1-N/M).$$

The value MbpF is approximately equal to an even division of the remaining HP channel capacity (after prioritizing the I frame) for the P frames of the group of frames. This is the minimum amount of data which must be applied to the high priority channel each P frame to preclude underflow of the high priority channel.

Calculation of Hfrac for I frames proceeds [612] by first updating the values Blgof(T) and Blgof(HP) according to $$Blgof(T)_{new\ GOF} = Blgof(T)_{last} + Bgof(T)$$

$$Blgof(HP)_{new\ GOF} = Blgof(HP)_{last} + Bgof(HP).$$

Two values of Hfrac are calculated, Hfrac and Hfrac$_T$. Hfrac is derived according to the relation;

$$Hfrac = \{bsize(HP)*PHP - bo(HP) + (R(HP)/Ns)\}/Nbits.$$

The first two terms in the numerator correspond to the currently available HP rate buffer space. The third term is the amount that the HP rate buffer will empty during a normal frame interval.

$$Hfrac_T = \{Blgof(HP) + [R(HP)/R(T)][Nbits - Blgof(T)]\}/Nbits.$$

The value of Hfrac output is the value calculated in the equation Hfrac unless $Hfrac_T$ is greater than Hfrac, in which case the value output for Hfrac is equal to the value calculated for $Hfrac_T$. A check is made to insure that this value of Hfrac will not cause the LP channel to underflow. The expected occupancy, EoLP, of the LP buffer is calculated according to the equation;

$$EoLP = (1 - Hfrac)Nbits + bo(LP) - R(LP)/Ns.$$

If EoLP is less than zero the value for Hfrac is calculated from;

$$Hfrac = 1 + \{bo(LP) - (R(LP)/Ns)\}/Nbits,$$

which will insure, on average, that just enough data will be allocated to the LP channel to preclude underflow. The value of Hfrac is then applied [620] to start analysis of the CW#j values of the I frame.

Hfrac for P frames is generated [616] according to the equation:

$$Hfrac = MbpF/Nbits$$

This value is applied [620] for generating the values CW#j for the respective P frames.

Hfrac for B frames is calculated [618] with the intent of allocating a majority of B frame information to the LP channel, i.e. all data except that which is considered vital. The levels considered vital in any particular layered hierarchy of data is of course subjective and is determined at the designer's discretion. Care must be taken to insure that the HP rate buffer does not underflow nor the LP rate buffer overflow. A variable MB is generated according to the relation;

$$MB = -bo(HP) + R(HP)/Ns.$$

If MB is greater than zero the HP buffer could underflow in which case Hfrac is determined from;

$$Hfrac = MB/Nbits \; (+ \text{ some margin}).$$

If an HP underflow condition does not exist a check is made to determine possible LP buffer overflow. This is accomplished by generating the variable MBX given by;

$$MBX = bsize(LP) - bo(LP) + R(LP)/Ns.$$

MBX is approximately the maximum amount of data that the LP buffer can hold under current load conditions. If Nbits is greater than MBX, the LP buffer may overflow, and Hfrac is generated from the relation;

$$Hfrac = 1 - MBX/Nbits \; (+ \text{ margin}).$$

If neither of the above two conditions exist, then Hfrac is set to zero, that is all data for the B frame is allocated to the LP channel. However some layers of data may still be directed to the HP channel by virtue of CW#j overrides.

Once Hfrac is determined, the priority selection process is initiated [620]. This priority selection process [622] may be of the type described with respect to FIG. 4, including the CW#j overrides [626]. Considering the MPEG like signal format which includes, in exemplary hierarchical order, frame headers, slice headers macroblock headers, motion vectors, and DCT coefficients, the override process may cause all data in hierarchical order from motion vectors and above, to be applied to the high priority channel. In addition there is included a CW#j correction process [624] to preclude too much data being allocated to the HP channel. In the correction process [624], the ratio Bf(HP)/Bf(T) is compared to the value of Hfrac, and if the ratio exceeds Hfrac, the generated value of CW#j is decremented by one unit. Following the CW#j correction, codeword data is allocated [626] between HP and LP channels and any layer overrides effected. After each CW#j analysis interval, the amount of data processed is accumulated [628] with the amount of data processed in prior analysis intervals for that frame, to update the variables Bf(HP) and Bf(T) used in the correction process [624].

Experiments have indicated that for the above Hfrac generation process, as might be expected, the occupancy of the high priority channel oscillates between a relatively full state for I frames and a relatively empty state for the last B frame of a group of frames. The occupancy of the low priority rate buffer appears to remain at a relatively constant level compared to the occupancy of the high priority rate buffer.

A further alternative treats the B frames as indicated immediately above, and treats the I and P frames on an equal basis. In this embodiment the values of Hfrac for respective I and P frames are generated according to the relation;

$$Hfrac = \{Blgof(HP) + R(HP)^*(Nbits - Blgof(T))/R(T)\}/Nbits$$

The processing steps for generating Hfrac may be programmed into the data analyzer 152 of FIG. 4, or in the system controller 18 shown in FIG. 1.

In the claims, a function described as being proportional to a variable means that the variable occurs in the numerator of a relationship defining the function. A function described as being inversely proportional to a variable means that the variable occurs in the denominator of a relationship defining the function.

What is claimed is:

1. Apparatus for parsing compressed video data between a high priority channel having a first channel capacity and a low priority channel having a second channel capacity, said compressed video data occurring as codewords of different types and in groups of frames, said apparatus characterized by:

means for generating values Blgof(HP) and Blgof(T), on a frame basis, and corresponding to remaining channel capacity for said high and low priority channels for respective groups of frames, and responsive to at least said value Blgof(HP), for generating a further value Hfrac representing the approximate fraction of said codewords to be applied to said high priority channel; and means responsive to said value Hfrac and said codewords for classifying said codewords according to a predetermined hierarchy of said types, and applying to the high priority channel, according to said hierarchy, the codewords of said types representing the Hfrac fraction of said compressed video data, and applying the remainder of the codewords to the low priority channel.

2. The apparatus set forth in claim 1 wherein said means for generating Hfrac, generates Hfrac according to the relation $$Hfrac = Blgof(HP)/Blgof(T).$$

3. The apparatus set forth in claim 1 wherein said means for generating Hfrac, generates Hfrac in direct proportion to Blgof(HP) and inversely proportional to the amount of data in respective frames to be parsed.

4. Apparatus for parsing compressed video data between high and low priority channels, said compressed video data occurring as successive groups of frames, GOF, of video data (N frames per group, N an integer greater than one) and as codewords of different types, said apparatus comprising:
  means for providing said compressed video data;
  a high priority channel, and a low priority channel;
  processing means for;
   a) generating values Blgof(HP) and Blgof(T) corresponding to the data capacity available in the high priority channel for the remaining frames of a GOF and the capacity available in both the high and low priority channels for the remaining frames of a GOF respectively;
   b) updating the values Blgof(HP) and Blgof(T) after respective frames of data are parsed; and
   c) generating a fractional value Hfrac corresponding to the fraction of data for a respective frame to be allocated to the high priority channel, said value Hfrac being directly proportional to the updated value Blgof(HP), and inversely proportional to one of, the updated value Blgof(T), and, the amount of data represented by said codewords in the current frame;
  further processing means, responsive to said compressed video data representing predetermined image areas of respective frames, for;
   a1) classifying respective codewords for each said image area according to a predetermined hierarchy of classes of codeword types;
   b1) determining the amount of codeword data representing said image area;
   c1) determining, from said amount of codeword data and the value Hfrac, according to class hierarchy, classes of codewords to be allocated to said high priority channel; and
   d1) dividing said codewords, according to class, between said high and low priority channels.

5. The apparatus set forth in claim 4 wherein said value Hfrac is determined according to the ratio of the high priority channel capacity remaining for the current group of frames to the total channel capacity (of both said high and low priority channels) remaining for the current group of frames.

* * * * *

UNITED STATES PATENT AND TRADEMARK OFFICE
CERTIFICATE OF CORRECTION

PATENT NO. : 5,231,384
DATED : July 27, 1993
INVENTOR(S) : Kuriacose Joseph

It is certified that error appears in the above-indentified patent and that said Letters Patent is hereby corrected as shown below:

Title page, item [19], change "Kuriacose" to --Joseph--.

Title page, item [75], change "Joseph Kuriacose" to --Kuriacose Joseph--.

Signed and Sealed this

Twenty-ninth Day of March, 1994

*Attest:*

BRUCE LEHMAN

*Attesting Officer*     *Commissioner of Patents and Trademarks*